United States Patent [19]

Kinoshita et al.

[11] Patent Number: 4,720,795
[45] Date of Patent: Jan. 19, 1988

[54] SEWING MACHINE INPUT DEVICE HAVING SCALING FUNCTION

[75] Inventors: Tomoaki Kinoshita; Kunio Takano; Masanori Nukushina; Yoichi Okiyama, all of Chofu, Japan

[73] Assignee: Tokyo Juki Industrial Co., Ltd., Chofu, Japan

[21] Appl. No.: 760,610

[22] Filed: Jul. 30, 1985

[30] Foreign Application Priority Data

Jul. 31, 1984 [JP] Japan .......................... 59-118125[U]

[51] Int. Cl.⁴ ....................... G06F 15/46; D05B 19/00
[52] U.S. Cl. .............................. 364/470; 112/121.12; 112/458; 364/192; 364/400
[58] Field of Search ... 364/200 MS File, 900 MS File, 364/300, 470, 475, 192, 468, 193, 191, 148, 400; 112/121.11, 121.12

[56] References Cited

U.S. PATENT DOCUMENTS

| | | | |
|---|---|---|---|
| 3,887,903 | 6/1975 | Martell | 364/200 |
| 4,149,246 | 4/1979 | Goldman | 364/470 |
| 4,546,434 | 10/1985 | Gioello | 364/300 |
| 4,583,181 | 4/1986 | Gerber et al. | 364/470 |
| 4,598,376 | 7/1986 | Burton et al. | 364/470 |

Primary Examiner—Joseph Ruggiero
Attorney, Agent, or Firm—Morgan & Finnegan

[57] ABSTRACT

A method and apparatus for inputting stitch patterns by way of a digitizer is effective to record stitching patterns which involve skipping and which extend beyond the digitizer board. In a method aspect, where stitch patterns involve skipping and the drawings of the patterns exceed beyond the digitizer plotting board, a method is provided including the steps of commanding scale-down input coordinate values and converting the input coordinate values to scale-up values to recover the reduced value. In an apparatus aspect, an input device is provided comprising a digitizer for drawing stitching patterns, control circuitry for performing scaling function, and command generating circuitry for commencing the scaling activity.

7 Claims, 5 Drawing Figures

SEWING MACHINE INPUT DEVICE HAVING SCALING FUNCTION

This application for United States patent is related to a second U.S. patent application Ser. No. 760,611 entitled "SEWING MACHINE INPUT DEVICE HAVING SCALING PROHIBIT FUNCTION," by T. Kinoshita, K. Takano and O. Tachikawa, filed July 30, 1985, now U.S. Pat. No. 4,646,246, the disclosure of which is hereby incorporated by reference.

BACKGROUND OF THE INVENTION

The invention pertains to a sewing machine input device. More particularly, the invention pertains to an industrial sewing machine input device which uses a digitizer to input stitching patterns.

Electronically controlled industrial sewing machines have previously been provided which read and execute stitch patterns previously stored as coordinate values on memory devices such as magnetic tapes, magnetic cards, or floppy discs. Based on the stored stitch pattern, a work holder is moved by a pulse motor which energizes in response to the coordinate values. Thus, sewing in accordance with a programmed stitch pattern is performed.

To perform the stitch pattern inputting function for this kind of sewing machine, stitch patterns may be drawn via an indicating pen on a digitizer (graph drawing apparatus). Resultant coordinate values are generated by the digitizer and recorded on a storage media.

FIG. 1 illustrates a conventional digitizer board 1 including two stitch patterns 2 and 3. To input such a pattern, a first stitch pattern 2 is drawn on digitizer 1, $\alpha 1$ is input as skipping distance factor, and then stitch pattern 3 is drawn.

During a sewing operation according to this stitch pattern, the first stitch pattern 2 is sewed first. Next, the work holder is skipped in response to skipping distance factor $\alpha 1$ and then the second stitch pattern 3 is sewed.

Conventionally, the input for the skipping factor is performed in 1/1 scale, thereby, where the skipping factor $\alpha 2$ exceeds beyond the digitizer area as in FIG. 2, it was impossible to complete the stitch patterns.

It is therefore an object of the invention to provide an input device for a sewing machine which is effective for drafting and recording stitching patterns which extend beyond a digitizer work board.

It is a further object of the invention to provide a sewing machine input device which is effective to trace oversized stitch patterns using a conventional size digitizer.

SUMMARY OF THE INVENTION

These and other objects of the invention are met by providing a sewing machine input device having a digitizer, a control circuit, instruction generating means for signaling the control circuit that input involving a skipping factor is being provided in a scale-down mode, control circuit means for converting the coordinate values of skipping work into scaled-up values to recover the scaled-down value, and means for recording the coordinate values. Thus, in drawing stitch pattern on digitizer, when the skipping distance exceeds beyond digitizer area, the skipping factor may be drawn in scale-down mode and the coordinate values of stitching pattern can be subsequently increased to recover the reduced values according to the skipping factor. Consequently, the invention is effective to draw stitching patterns on digitizer even where the stitching pattern profile exceeds beyond the digitizer plotting area.

BRIEF DESCRIPTION OF THE DRAWINGS

The invention will be described more fully below by way of reference to the following drawings, in which.

DETAILED DESCRIPTION OF THE DRAWINGS

Figure 1:
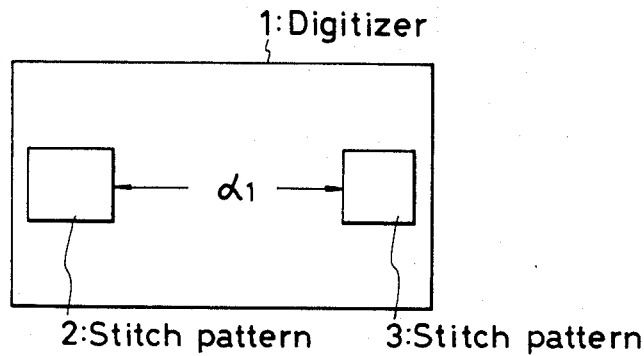
FIG. 1 and FIG. 2 illustrate inputting stitch patterns via conventional stitch pattern inputting devices.
Figure 2:
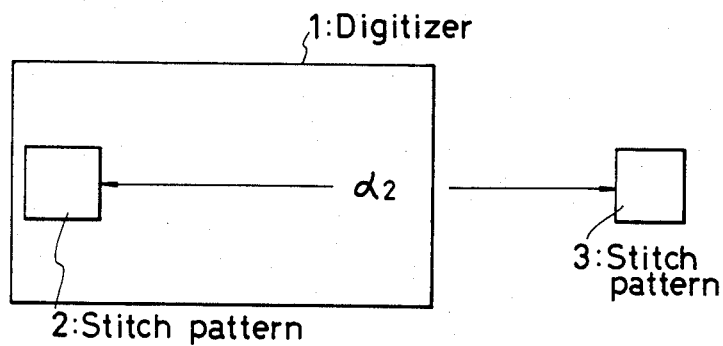
Figure 3:
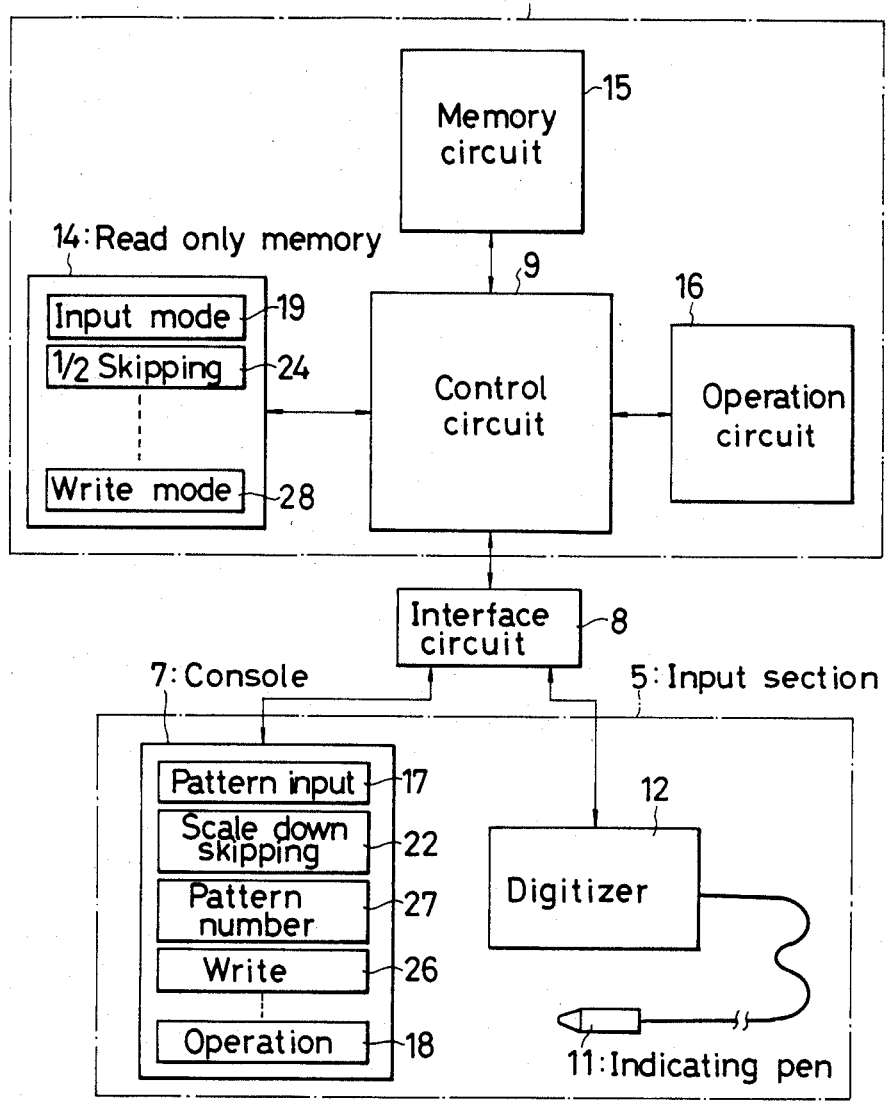
FIG. 3 is a block diagram of the invention.

FIG. 3 illustrates a block diagram of one embodiment of the invention. Illustrated in FIG. 3 are an input section 5 and a control section 6. Console 7, which is functionally part of the input section, is connected through interface circuit 8 to the control circuit 9. Control circuit 9 works as a micro-processor of the control section 6. Digitizer 12, having an indicating pen 11, is connected through interface circuit 8 to the control circuit 9. Control circuit 9 is provided access to the read only memory (ROM) 14 in which system programs are stored and writable memory (RAM) 15 which may be used to store stitch patterns. Control circuit 10 also articulates operation circuit 16.

ROM 14 includes control programs for governing input mode 19, ½ skipping mode 24, and write mode 28.

The operation of the embodiment of FIG. 3 is substantially as follows. At first, the pattern input key 17 and the operation key 18 on console 7 are pressed. Then, the control circuit 9 selects the input mode program 19 from memory circuit 14. Conforming to the input mode program 19, the embodiment begins processing.

Figure 4:
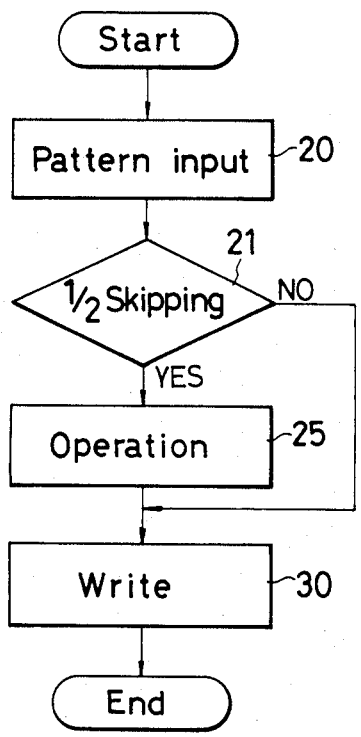
FIG. 4 is a flow chart of the invention.
Figure 5:
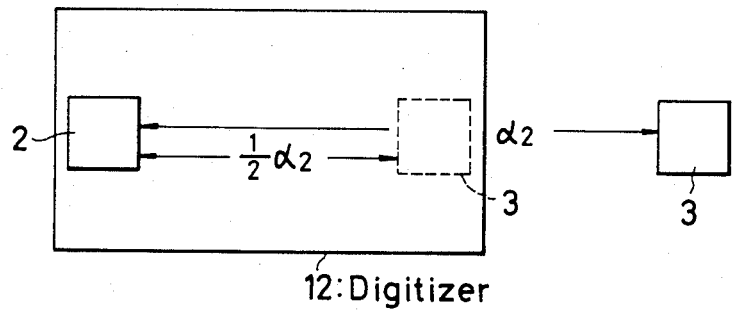
FIG. 5 is an illustration of a digitizer board showing a manner in which stitch patterns may be inputted using the instant invention.

During the input mode, a first stitch pattern 2 may be drawn, as illustrated in FIG. 5, on digitizer 12 with indicating pen 11 (refer to FIG. 4 block 20). Next, control circuit 9 determines if scale down skipping is indicated for this input (refer to FIG. 4 block 21). In this first example, scale-down skipping mode is not detected and so coordinate values of the stitch patterns are sent directly to control circuit 9 from digitizer 12 and are stored in control circuit 9.

When pattern skipping is to be inputted, and the skipping distance extends beyond the drawing board of the digitizer 12, as FIG. 5 further shows, scale-down skipping key 22 and operation key 18 on console 7 are pressed and thus scale-down skipping mode 24 is selected. In the embodiment of FIGS. 3, 4 and 5, the scale-down factor is one-half ½. Of course, skipping factors of other than one-half ½ are clearly contemplated by the invention.

Under the one-half ½ skipping condition, skipping distance ½$\alpha 2$ is drawn on the digitizer 12 in half scale of the actual distance. Thereafter, stitch pattern 3 is drawn on the digitizer 12 with indicating pen 11. In this case, the control circuit 9 recognizes the ½ scale skipping mode (refer to FIG. 4 Block 21), and in the operation circuit 16, the coordinate value "X" of the stitch pattern 16 is doubled (refer to FIG. 4 Block 25). By this process a ½$\alpha 2$ skipping pattern is drawn in half scale at digitizer 12 and produces a stitch pattern with $\alpha 2$ skipping.

After the above-described ½ skipping mode inputting, write key 26 may be pressed to initiate the pattern writing sequence. Further, by pressing the pattern number key 27, a particular pattern number may be selected to be associated with the particular stitch pattern. Subsequently, if operation key 18 is pressed, a stitch pattern with skipping α2 as shown in FIG. 5 is written from control circuit 9 to memory circuit 15. Preferably, during writing mode 28 the stitch pattern will be written into an address in memory circuit 15 (refer FIG. 4 Block 30) corresponding to the respective pattern number.

In one embodiment of the invention, the memory circuit 15 is a RAM type of memory device. However, floppy discs or other storage media can be substituted therefore. In the case of a floppy disc storage system, the floppy disc may be taken out of the apparatus after the writing process and set into a disk reading apparatus of a sewing machine and thus be read thereby.

It may thus be realized that with the invention, in drawing stitch pattern on a digitizer where the stitch pattern skipping distance exceeds beyond the digitizer area, the skipping factor may be drawn in scale-down mode and the coordinate value of skipping factor can be subsequently increased to recover the reduced value. Consequently, the invention is effective to draw stitching patterns on digitizer even when the stitching pattern profile exceeds beyond the digitizer plotting area.

As may apparently widely different embodiments of the invention may be made without departing from the spirit and scope therein, it is to be understood that the invention is not limited to the specific embodiments herein described except as defined in the appended claims.

We claim:

1. An input device for recording stitching patterns for an electronically controlled sewing machine, comprising: inputting means for inputting coordinates of a stitching pattern to control means, said inputting means including means for scaling the coordinates of at least a portion of said stitching pattern to a scale other than its actual size; said control means including means for detecting and converting said scaled coordinates back to the actual size of said stitching pattern, and writing said converted coordinates to storage means wherein said storage means stores said stitching pattern coordinates values.

2. An input device according to claim 1 wherein said stitching pattern includes a skipping factor and said means for scaling only scales the skipping factor portion of said stitching pattern.

3. An input device, as recited in claim 1, wherein said inputting means comprises a digitizer and a stylus.

4. An input device, as recited in claim 1, wherein said storage means is a floppy disk.

5. An input device, as recited in claim 1, wherein said storage means is a random access memory device.

6. An input device, as recited in claim, 1 wherein said means for detecting and converting said scaled coordinates include means for generating a stitching pattern number and means for associating said stitching pattern number with said stitching pattern prior to storage in said storage means.

7. In an electronic inputting device, a method for inputting and storing sewing machine stitching patterns comprising the steps of:
   (a) electronically signaling a control circuit that a stitching pattern skip portion will follow in a scaled-down mode with reduced skip portion values;
   (b) reading stitching pattern input coordinates from a digitizer in a scaled-down mode; and
   (c) converting the scaled-down input coordinates to scaled-up values to recover the reduced values.

* * * * *